US009148658B2

(12) United States Patent
Pritch et al.

(10) Patent No.: US 9,148,658 B2
(45) Date of Patent: Sep. 29, 2015

(54) LIGHT-BASED CAUSTIC SURFACE CALIBRATION (71) Applicant: DISNEY ENTERPRISES, INC., Burbank, CA (US)

(72) Inventors: Yael Pritch, Cupertino, CA (US); Quinn Smithwick, Pasadena, CA (US); Alexander Sorkine Hornung, Zurich (CH); Nicola Ranieri, Glarus (CH); Anselm Grundhofer, Greifensee (CH); Lanny S. Smoot, Thousand Oaks, CA (US); Simon Heinzle, Zurich (CH); Markus Gross, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 134 days.

(21) Appl. No.: 14/155,627

(22) Filed: Jan. 15, 2014

(65) Prior Publication Data
US 2015/0201188 A1    Jul. 16, 2015

(51) Int. Cl.
*H04N 17/00*    (2006.01)
(52) U.S. Cl.
CPC .................................. *H04N 17/004* (2013.01)
(58) Field of Classification Search
CPC .... G02B 27/123; G02B 27/148; G02B 3/005; G02B 19/0066; H04N 13/0404; H04N 1/0289; H04N 1/02895
See application file for complete search history.

(56) References Cited

U.S. PATENT DOCUMENTS 5,424,553 A * 6/1995 Morton ......................... 250/548
5,568,314 A   10/1996 Omori et al.
5,689,340 A * 11/1997 Young ........................... 356/401
6,144,496 A * 11/2000 Goto .............................. 359/619
6,877,857 B2 * 4/2005 Perlin ............................... 353/7
8,190,042 B1 * 5/2012 Egert et al. ...................... 399/45
8,212,945 B2 * 7/2012 McFadyen et al. ........... 348/745
8,240,854 B2 * 8/2012 Krijn et al. ........................ 353/8
8,390,677 B1 * 3/2013 Said .............................. 348/51
2005/0083516 A1 * 4/2005 Baker ........................... 356/124

(Continued)

FOREIGN PATENT DOCUMENTS

WO    01/73497    10/2001

OTHER PUBLICATIONS

Tompkin et al, "Interactive Light Field Painting," SIGGRAPH 2012, Los Angeles, California, Aug. 5-9, 2012.

(Continued)

*Primary Examiner* — Victor Kostak
(74) *Attorney, Agent, or Firm* — Marsh Fischmann & Breyfogle; Kent A. Lembke (57) ABSTRACT A method for performing light-based calibration of optics with caustic surfaces. The method includes mapping a light detecting device to a programmable light source. Then, the method includes operating a calibration light source to direct light onto one or more caustic surfaces of an optical assembly, e.g., an assembly of one or more lenses, facets, lenticules, and lenslets. The method may then involve, with the light detecting device, capturing an image of a projection surface of the optical assembly, which is opposite the one or more caustic surfaces in the optical assembly, as the projection surface is illuminated by the light from the light source. Further, the method includes processing the captured image, along with the mapping of the light detecting device to the programmable light source, to generate a calibration map of the optical assembly including the caustic surfaces.

18 Claims, 6 Drawing Sheets

(56) References Cited

U.S. PATENT DOCUMENTS

| | | | |
|---|---|---|---|
| 2005/0174775 A1* | 8/2005 | Conner | 362/268 |
| 2006/0066879 A1* | 3/2006 | Bast et al. | 358/1.1 |
| 2008/0129894 A1* | 6/2008 | Kang et al. | 348/758 |
| 2009/0153959 A1* | 6/2009 | Tao et al. | 359/463 |
| 2011/0025832 A1* | 2/2011 | Cowan et al. | 348/51 |
| 2014/0240489 A1* | 8/2014 | Furnas | 348/131 |

OTHER PUBLICATIONS

Ng, et al, "Light Field Photography with a Hand-held Plenoptic Camera", Stanford Tech Report CTSR Feb. 2005.

Papas, et al, "The Magic Lens: Refractive Steganography", from the ACM SIGGRAPH Asia 2012 conference proceedings.

\* cited by examiner

LIGHT-BASED CAUSTIC SURFACE CALIBRATION

BACKGROUND

1. Field of the Description

The present invention relates, in general, to optical devices used in three dimensional (3D) displays, and, more particularly, to methods and systems for calibrating optical devices or assemblies that have one or more caustic surfaces.

2. Relevant Background

Optical devices with caustic surfaces are used in a wide range of applications such as in glasses-free 3D displays, in directional lighting assemblies, to provide unique toys, and for art installations. In optics, a caustic surface is a surface to which all light rays emanating from a single point and reflected by a curved surface (such as a concave mirror) are tangent, and a caustic may refer to an envelope of light rays reflected or refracted by a curved surface or object or the projection of that envelop of light rays onto another surface. In other words, caustic surfaces may display light from a light source (e.g., a projector) as concentrated patches of light or bright edges.

The most well-known caustic surface is a lens or lens array that may be used in a 3D display. For example, a fly's eye display lenslet may be used in many glasses-free 3D display technologies. In another example, a lenticular array may be used to display a flip image with one or more flipping regions where differing images are displayed to an observer. Glasses-free 3D display technologies may achieve a 3D effect by spatially multiplexing different images corresponding to different viewpoints into different directions by putting a lenslet array on top of an image surface. When the image surface is at the focal plane of the lenslet array, each of the display pixels below one lens is exposed to a different viewing angle, and this effect can be used to show different images to different viewers (e.g., flip images) or even different views of the same scene to achieve a 3D effect. Similarly, interestingly shaped caustic surfaces can be found in many toys, figurines, and gadgets/products, and, in their operation to provide displays or light effects, these may rely on the same principles of sending different image positions in different directions.

The quality of the imagery provided by many of these optical assemblies or devices may be unacceptable or at least diminished because most of these devices are not calibrated at all. The caustic surface (or optical assembly with one or more caustic surfaces) is designed and manufactured, but the alignment of the caustic surface facing toward the display surface(s) can only be done with machine precision. However, imperfections and flaws in the caustic surface due to the manufacturing process as well as slight misalignments, such as due to temperature changes, can lead to distracting or even unacceptable visual artifacts in the displayed images on the display surface(s).

When calibration is performed, it often still does not address issues involved with use of caustic surfaces in display systems. For example, in the case of lenslet arrays (which provide the caustic surface (or the reflective/refractive surface) of the optical assembly or optics), the current state-of-the-art calibration technique relies on special frequency patterns that are used to estimate the lens pitch, which in turn is then used to compute the pattern to display. However, this calibration method fails when lens pitch varies over the lens array and also does not consider other lens parameters including imperfect or changing focal length.

For some 3D display systems, some calibration approaches have been investigated that use a closed feedback loop to expose different images to different viewers. In one exemplary calibration attempt, left and right halves of viewer faces were illuminated with light of different wavelengths and captured by a camera focusing on this audience. The captured information was then adjusted and deformed to illuminate a display surface through an optical system such as by making some content visible only to the illuminated left eyes and some only visible to the right eyes. While being useful for some applications, such systems still require careful alignment and additional calibration of different components, which may be difficult. Further, these systems are often relatively complex to assemble and operate, are expensive to fabricate or assembly, and are typically very bulky.

Hence, there remains a need for improved methods of calibrating optics or optical assemblies that include one or more caustic surface. Preferably, such methods may be implemented with a calibration system that is inexpensive and not overly complex to implement and use. In some cases, it may be preferable for the optical calibration method to output a mapping or calibration map that can be readily used to project light or display images through the caustic surface(s) of the optical assembly onto a display surface(s), e.g., provide a mapping from image pixels to viewing positions.

SUMMARY

The present description teaches a method for a light-based calibration method (and calibration system implementing such a method) for use with optical assemblies or systems that include one or more caustic surfaces (e.g., an optical element with one or more caustic (or reflective and/or refractive) surfaces). The calibration method is "light-based" because it can use one or more light sources to calibrate a single caustic surface or more typically an optical assembly/device with an arrangement of caustic surface patches/elements such as lenses, facets, and other optical components that may have a wide variety of shaped curves. The caustic surface(s) of the optical assembly are arranged to face or be directed toward a display surface that may have a range of shapes (e.g., an arbitrarily shaped display surface).

The light source is positioned in a display space at a viewing position (e.g., a position from which an image displayed from the caustic surface will be viewed in later uses of the optical assembly within a display system in the 3D world). Then, light from the calibration light source strikes the front or caustic surface of the optical elements/components of the optical assembly, and the light is optically refracted and/or reflected on the caustic surface and forms an illumination pattern that may be captured by a sensing device (e.g., any photo sensor with some displays having per emitting pixel a coupled sensing sensor, a camera, or the like) that is positioned at a projection/display position for the optical assembly (e.g., a position where a projector or an image source will later be provided within a display system including the optical assembly). The observation of this illumination pattern, given the known location of the calibration light source and without prior knowledge about the caustic surface's shape(s), leads to a mapping of locations on the caustic display surface/viewing position to angles in the 3D world.

Using this pre-calibrated mapping (e.g., a calibration map for an optical assembly or its caustic surface), the display surface (i.e., the caustic surface) can be configured, such as by feeding light or imagery via a particular projector or image source to the optical assembly, to emit light in a way that causes a specific light field to be visible in front of the display surface (i.e., the caustic surface). If the calibration system/ assembly is used as a closed feedback loop between an observer and a display system incorporating the calibration system, a dynamic observer-dependent light field can be selectively emitted through the optical assembly and its caustic surface(s) through selective operation of the light/image source (e.g., a projector or the like projecting light onto the back surface of the caustic surface element). This feedback loop may be designed to omit the prior need for mechanically aligning the different components of the display system, which was a daunting and challenging task.

More particularly, a method is provided for performing light-based calibration of optics with caustic surfaces. The method includes mapping a light detecting device to a programmable light source. Then, the method includes operating a calibration light source to direct light onto one or more caustic surfaces of an optical assembly (e.g., an assembly of one or more lenses, facets, lenticules, lenslets, and so on). The method may then involve, with the light detecting device, capturing an image of a projection surface of the optical assembly, which is opposite the one or more caustic surfaces in the optical assembly (e.g., the back side of a lenslet array or planar surface of a lenticular sheet), as the projection surface is illuminated by the light from the light source. Further, the method includes processing the captured image, along with the mapping of the light detecting device to the programmable light source, to generate a calibration map of the optical assembly including the caustic surfaces.

In practicing the calibration method, the light detecting device may be or include a digital camera, and the step of mapping of the light detecting device to the programmable light source may include mapping pixels of the digital camera to pixels of the programmable light source. The programmable light source may take a number of forms such as a digital projector, a liquid crystal display, or an organic light emitting diode display. The calibration map that is generated during calibration may include a mapping of illuminated ones of the pixels of the digital camera to a set of the pixels of the programmable light source. The calibration method may also include generating a lookup table from the calibration map and operating the programmable light source to project light onto the projection surface using the lookup table to selectively illuminate sets of pixels.

In some cases, the method includes determining a position of the calibration light source during operating of the calibration light source step. In this regard, the calibration map of the optical assembly can be linked or associated to the position of the calibration light source to define operations of the programmable light source to illuminate the projection surface to direct light toward the position of the calibration light source. Then, the method may also include moving the calibration light source to a different position and repeating the operating, the capturing, the processing, and the determining steps to create a different calibration map associated with the different position of the calibration light source. The caustic surfaces or caustic surface patches of the optical assembly may be at least one of: lenticules in a sheet of lenticular material; lenses of a lenslet array; facets of a transparent element; and curved surfaces of an optical element (e.g., lenses).

DETAILED DESCRIPTION

Briefly, the present description teaches a calibration system and method for use in calibrating an optical assembly that has one or more caustic surfaces such as one or more lenses, lens arrays (e.g., lenticular sheets, fly's eye display lenslet, and the like), facets, and so on. One object or goal of such a calibration system and method may be to provide a setup that can be used to calibrate a caustic surface relative to an image generating device (or image source or display light source). The calibration is performed in a way or has a result (e.g., a calibration map) that allows an arbitrary light field to be reproduced at a viewing position or space or when looking at the image generating device through the caustic surface.

Another goal or object of the described calibration system and method may be to teach a calibration setup/system that can be used to find the mapping between pixels of an image generating device and rays in space, which in turn can be used to form an output light field. The calibration mapping (pixel-to-ray mapping) can be, but is not limited to, a pre-computed lookup table, a mapping function, or a value evaluated/determined directly in a real time feedback loop.

To achieve these and other design goals, the calibration assembly or system may include: at least one light source; at least one caustic surface patch or element (i.e., an optical element with a caustic surface) of any shape that is to be calibrated; an image generating device, which may be implemented in many ways (e.g., have an arbitrary form); and at least one observing device (or light sensing device) to capture the light patterns refracted and/or reflected by the caustic surface of the optical element. In some implementations, a light source is positioned in front of the caustic surface, and the light from this source is refracted and/or reflected on the caustic surface so as to form a caustic pattern on the surface of the image generating device. The observing or light sensing device may be calibrated or configured to get a mapping between observations and the image generating device (e.g., a software program may be used to cause a processor to generate a calibration map between the light source position and the image generating device or its pixels).

Using the calibration map and the observation made, the image generating device may be controlled to expose light or an image (such as colors) in the pixels or pixel regions illuminated by the caustic pattern. Due to the invertible nature of light, the exposed or projected light or image (such as colors) will be visible from the position of the light source. Examples of useful calibration light sources include small point sources and directed lasers, but other light sources may be used, e.g., an illuminated body part (such as by illuminating a viewer's faces/eyes) of a viewer may be used as the calibration light source when it is exposed to light (i.e., selectively illuminated). The observed patterns can then be used to update or control the image generating device in real time to adjust to varying viewer positions.

In another embodiment, multiple light sources with different wavelengths or one light source moved to different positions over time may be used in a pre-calibration step to gain knowledge about the mapping function from image generating device pixels to space coordinates and/or angles. This information can then be used in a later stage to reconstruct a desired light field either in a static manner for one-to-many viewing positions or adaptively for one or more specific viewer positions that may be defined by eye position tracking devices. Light sources with different wavelengths can also be used to account for chromatic aberrations.

Figure 1:
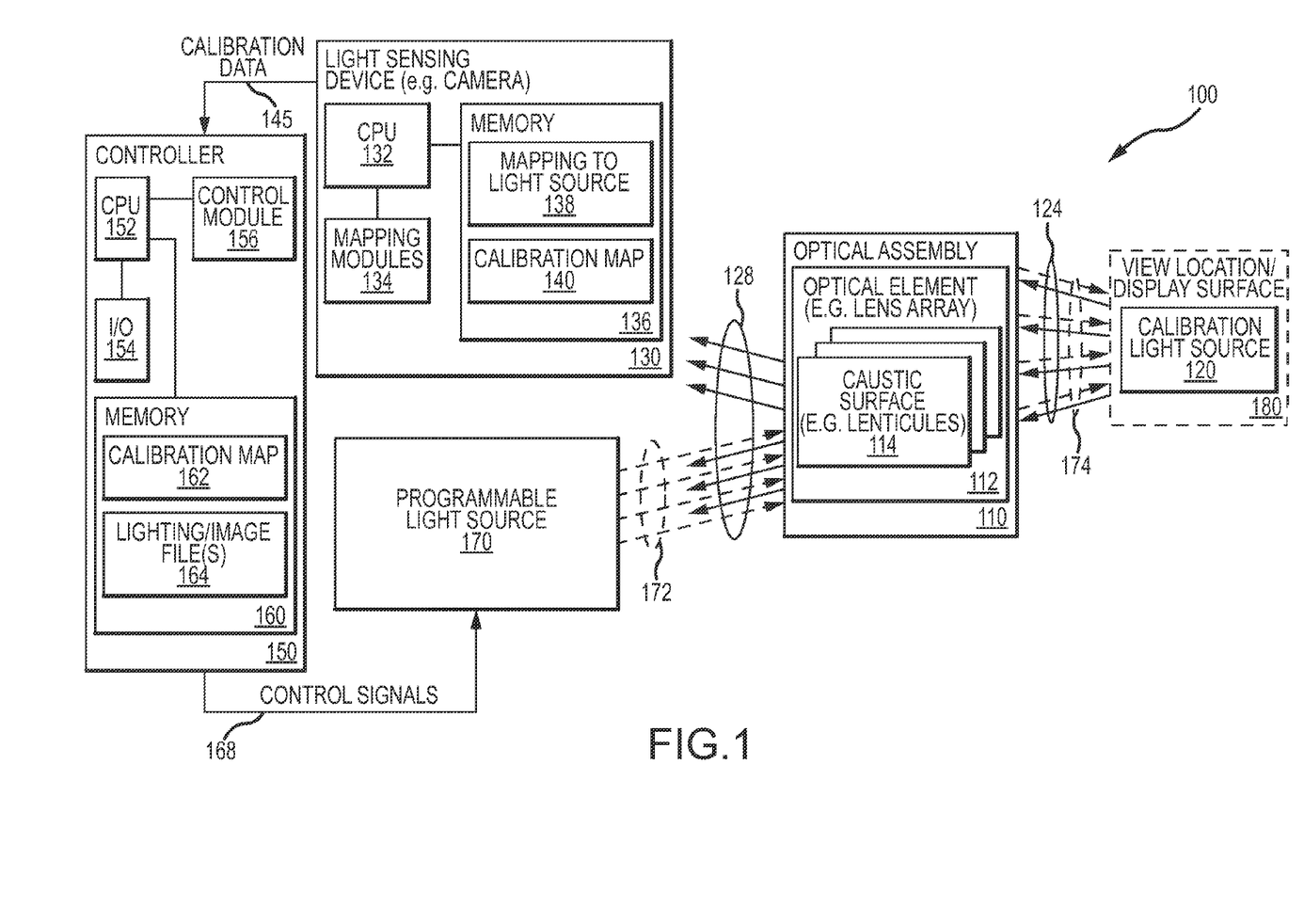
FIG. 1 is a functional block diagram of a display system with a calibration assembly/apparatus provided for providing light-based calibration of caustic surfaces of an optical assembly or optics of the display system.

FIG. 1 is a functional block diagram of a display system 100 with a calibration assembly or apparatus that is adapted for providing light-based calibration of caustic surfaces of an optical assembly or optics of the display system 100. As shown, the display system 100 includes an optical assembly 110 that may take a wide range of configurations to practice the described calibration techniques and is used generally to focus through refraction, reflection, and the like light from a programmable light source 170 (e.g., a light source that may be operated to light sets of pixels as desired such as with differing colors). The light transmitted or projected from the optical assembly 110 is shown at 174 as being directed toward or focused onto a view location or display surface 180 (e.g., a location of viewer's eyes, a projection screen, a wall, or the like).

The optical assembly 110 includes one or more optical elements 112 such as a lenticular sheet, a fly's eye display lenslet, a lens, a faceted surface, or the like. Each of these optical elements 112 may have one or more caustic surfaces 114, which may be provided by facets, lenticules, curves, and so on, that are provided on a surface(s) of the optical elements 112. The specific configuration of the optical assembly 110 and its optical elements 112 is not limiting of the present description. However, as discussed above, optical elements 112 with caustic surfaces 114 are typically manufactured with at least some imprecision that can result in visual artifacts without proper calibration.

To this end, the display system 100 is shown to include a calibration light source 120 such as a point source, a laser, or the like, that is selectively operable to direct light 124 onto the caustic surfaces 114 of the optical elements 112. During light-based calibration, the calibration light source 120 is positioned at a location that corresponds with the intended view location or display surface (plane) 180 for the display system 100. As a result, the light 124 is projected onto or provided to the side of the optical elements 112 facing outward into a view space or volume containing the view location/display surface 180 and through which the output light 174 is transmitted during display operations of the system 100.

The received light 124 is reflected and/or refracted by the caustic surfaces 114 of the optical element 112 and output toward the programmable light source 170. In other words, caustics 128 are emitted from a side opposite the side of the optical elements 112 that receives the calibration light 124. To assist in the light-based calibration, a light sensing device 130 such as a digital camera or any light sensing diode or photo diode or array of such devices (with it being understood that a camera as used herein is basically an array of photo diodes) is positioned proximate to programmable light source 170 or at least on the same side of the optical assembly 110 as the programmable light source 170 (e.g., an image source such as a projector or a display screen/monitor).

The light sensing device 130 includes a processor 132 that executes computer programs or code in computer readable media to provide a mapping module(s) 134. The mapping module 134 may function to map the light sensing device 130 and its position to the programmable light source 170. In some cases, the mapping module 134 generates a file providing the mapping to the light source as shown at 138 as stored by the processor 132 in memory 136 of the device 130, and this may involve mapping pixels of the light sensing device 130 (or its receptor element(s)) to pixels of the output portion of the programmable light source 170. In other cases, the mapping is expressed as a function, and parameters of the function are derived during calibration, e.g., a homography matrix can be derived from calibration. Of course, the mapping can also be described using more complex, non-linear mappings, if required or desired, such as thin plane splines and so on.

During calibration, the light sensing device 130 receives the caustics or light output 128 from the optical assembly 110 after receipt from the calibration light source 120 and reflection/refraction by caustic surface 114. The mapping module 134 or other components of the light sensing device 130 act to generate a calibration map 140 based on the received light 128. The calibration data 145 (such as the map 140) are provided to a controller 150 for the programmable light source 170. The controller 150 includes a processor 152 that manages input/output (e.g., a keyboard, a mouse, a touch screen, and so on) that allows an operator to input data such as to initiate a calibration process or to modify lighting/imagery displayed by the light source 170. The processor 152 also manages memory 160 and stores the received calibration data or map at 162.

The controller 150 may include software/code to provide a control module 156 that may process the calibration map 162 along with image or lighting files (not shown) to create lighting or image files 164 that are calibrated to the caustic surfaces 114 of the optical elements 112. These lighting/image files 164 may then be used by the control module 156 to generate control signals 168 that are transmitted to the programmable light source 170 during display operations of the system 100 to cause the light source 170 to transmit light 172 onto and through the optical assembly 110 and its optical elements 112 to be reflected/refracted. This light or caustics 174 are transmitted outward as shown to a view location or display surface 180 in a manner that is specifically calibrated or tuned to the caustic surfaces 114 of the optical elements 112.

Figure 2:
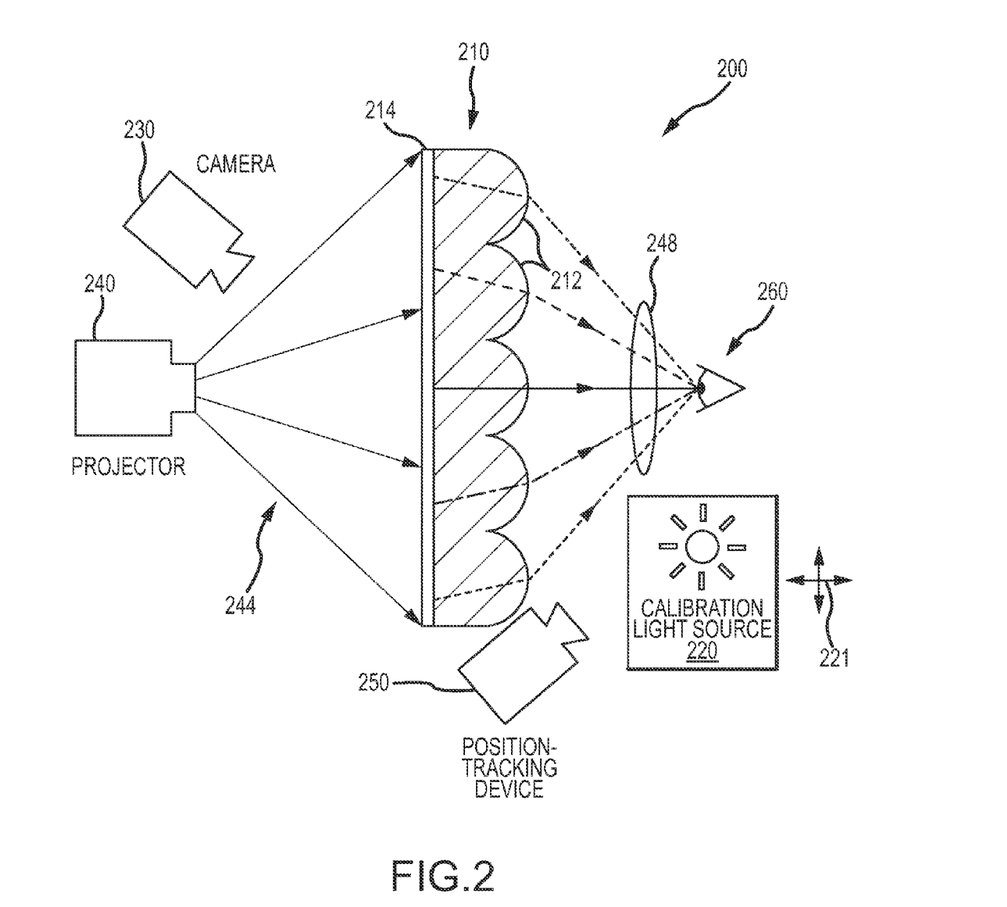
FIG. 2 is a functional block or schematic diagram of a 3D display system adapted for light-based calibration of caustic surfaces.

With this general display system 100 and how a light-based calibration process may be implemented understood, it may be useful at this time to describe several more specific embodiments of systems using the calibration techniques described herein. FIG. 2 illustrates a display system 200 adapted for light-based calibration of caustic surfaces. The system 200 includes optics 210 that are made up of a sheet of lenticular material or a fly's eye lenslet array with a planar back surface or side 214 and a front surface or side on which a plurality of lenticules or fly's eye lenses 212 are provided. In other words, the caustic surface patches in the optics 210 are lenticules or fly's eye lenses forming a lenslet array 210. The optics/array 210 is arranged with its caustic surfaces or lenticules 212 facing outward into a display space in which a viewer or audience member 260 may be located, and, in this position, the planar back projection surface 214 faces toward a space in which projector 240 is provided. During display operations of the system 200 as shown in FIG. 2, the projector 240 is operated to display light (images) 244 onto the back projection surface 214 and after refraction/reflection by the lenticules or caustic surfaces 212 the light 248 is projected or directed toward the viewer 260.

To allow calibration, the system 200 includes a calibration light source 220 that may be moved as shown with arrows 221 in the display/viewing space in front of the lenticules 212 of optics 210 to positions corresponding with viewer 260 or viewing locations. The lenslet array or sheet of material 210 is placed in a way that the projection surface of the projector 240 corresponds with the focal plane of the lenslets/lenticules 212. Further, a calibration camera 230 is provided in the system 200 and is positioned to be facing the back projection screen or surface 214 (i.e., on the same side of the optics 210 as the projector 240). Additionally, the system 200 further includes a position-tracking device 250 such as a stereo camera pair or the like that is positioned to track the position of the calibration light source 220 during calibration steps and to track a position of the viewer 260, in some cases, during display operations of the system (e.g., during projection of light 244 by the projector 240 based on a calibration map).

Figure 3:
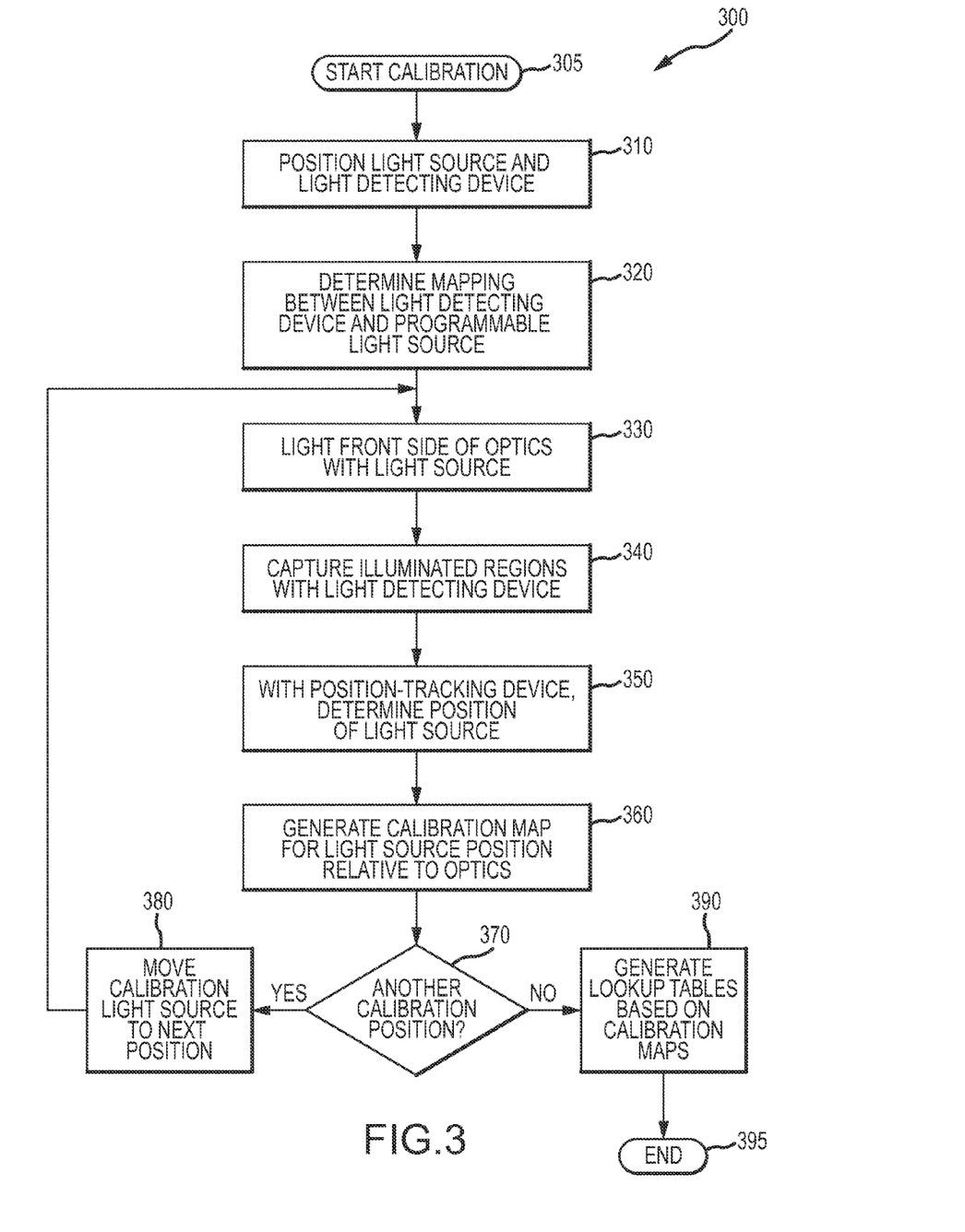
FIG. 3 is a flow diagram of one exemplary light-based calibration process for use with optics or optical assemblies with one or more caustic surfaces.

FIG. 3 illustrates a method 300 of performing light-based calibration of caustic surfaces, and the method 300 may be implemented by operation of the system 200 of FIG. 2 (or the system 100 of FIG. 1 or other display/calibration systems discussed herein). The calibration starts at 305 such as with selecting a display system with optics or an optical assembly that would benefit from calibration such as a 3D display system that relies on lenticular sheets or fly's eye lenslet or other lens arrangements with caustic surfaces. At step 310, the method 300 involves selecting a calibration light source such as a point source or a source of collimated light and also selecting a light detecting device such as a digital camera. The light source is positioned in a first position in a viewing space (e.g., where viewer's will be located or where a display surface is located in some cases) and oriented to direct its light onto the front surface(s) of the optics (such as onto a side of a lenticular sheet or a lenslet array having the lenticules or fly's eye lenslets). The light detecting device is positioned on the opposite side of the optics and its optical element with caustic surfaces, and it is oriented to focus on the back surface or projection surface of the optics/optical assembly (e.g., a planar side of a lenticular sheet or lenslet array).

At step 320 of the method 300, a mapping is determined between the light detecting device (e.g., a camera) and the programmable light device (e.g., a projector). In this early step of method 300, the mapping between a camera or other light detecting device, which is facing the projection screen, and the projector or other programmable light device is computed. This may be achieved using existing or to be developed camera-to-projector mapping methods. This mapping relates each camera (or other light detecting device) pixel to each projector pixel and vice versa. The mapping typically should not necessarily be discrete from pixel to pixel, but it might be continuous to achieve sub pixel accuracy. The mapping may be designed to be (or be determined so as to be) from each pixel of one device to a floating point pixel position on the image plane of the other device (due to resolution differences and orientation in space).

In step 330 of the calibration method 300, the light, such as a point light, positioned in front of the display's optical assembly or optics is used to provide light (e.g., point light) to brightly illuminate regions under each caustic surface (e.g., under each lens, lenticule, lenslet, curved surface, facet, or the like). At step 340, the light detecting device such as a camera is used to capture or record a digital image of the illuminated regions of optics such as of the projection surface (e.g., focal plane of the lenses, lenticules, lenslets, or the like in the optics, which may be the planar back surface of the lenticular sheet, a lens array, or the like). Step 350 may be performed concurrently with step 340 and involves use of the position-tracking device to determine the current position of the calibration light source in the display space in front of the optics/optical assembly (e.g., relative to the projection screen).

At step 360, a calibration map is generated (e.g., by software provided in the light detecting device or in a controller used to operate the programmable light source/projector) for the calibration light source's current position. With the light source position information and the captured illumination of the optics/projection screen or surface by the calibrating light, the recorded camera image or light detecting data not only relates projector or other programmable light source pixels to illuminated areas on the projection screen/surface (or focal plane of optics) but also incident angles and a mapping towards the spatial position of the light source in front of the projection screen/surface.

It typically will be desirable or useful to provide similar calibration maps for each position in the display space in front of the optics/projection surface that will likely be taken by a viewer or audience member (or a different portion of a display surface in some cases). In such cases, the method 300 is shown to include a step 370 of determining whether another calibration position remains. If so, at step 380, the calibration light source is moved to a next or another one of these calibration positions in the display space, and the method 300 continues at 330. In this way, a new illumination image is recorded along with a new light source position until all desired viewing locations have been recorded and calibration maps generated for the optics and the included caustic surfaces. Alternatively, multiple calibration light sources may be used and placed at each desired viewing location. These light sources may have different wavelengths to allow concurrent illumination and recording to be performed to avoid repetitive processes.

The method 300 then continues at 390 with further processing the calibration maps/data for later use in controlling a programmable light source such as a projector with light-based calibration. Step 390 may involve generating a look-up table, which may be stored in memory accessible by a controller of the programmable light source. The look-up table contains information that maps each projector (or other programmable light source) pixel through the optics (e.g., its caustic surface patches as may be provided by its lenslets) toward different viewing angles or viewing positions in the display space. Missing values may be determined by interpolation or through the use of a function (e.g., a polynomial can be fitted through the points and be evaluated for any desired angle) or the mapping can be approximated not by a LUT but a continuous function where the function parameters are estimated through the calibrated values.

With reference again to FIG. 2, in the operational or display mode of the calibration light source 220 and the calibration camera 230, the position-tracking device 250 is used to determine the eye position for both eyes of each viewer 260. For each lenticular/lenslet/lens 212, the positions can be used to access the look-up tables (or the calibration maps/data) to define pixels of the projector or other programmable light source that should be illuminated to provide a left eye view or a right eye view of each of the viewers (or even according to the corresponding individual viewing point per eye in the audience in the display space in front of the calibrated optics/optical assembly with its caustic surfaces).

Conflicts, where a certain projector pixel has to show different views at the same time, can be solved by masking the pixels black for crosstalk reduction or the colors can be blended. Note, this calibration procedure, and the corresponding display procedure, can be applied to nearly any optical assembly, e.g., a lenticular-based image generating system. For example, it can be applied to display systems where, in the optical assembly, the back of the lenslet array can be observed and imaged with a camera. For instance, this may be true for many liquid crystal display (LCD)-based systems where the back light can be removed (and put back on after calibration) or any other transparent technology (such as organic light emitting diode (OLED) displays). The same setup shown in FIG. 2 and discussed with reference to FIG. 3 may be used without the tracking device to calibrate the system to multiple viewers located approximately in the same viewing distance from the display, as it can be used instead of the standard calibration method that are based on a Moire pattern and are unable to handle lens and system inaccuracies.

Moreover, analysis of the illuminated region can be adapted to reveal and/or identify hidden limitations of the display system that are otherwise difficult or even impossible to observe, without directly having an accurate parametric model of the system. An example of one such limitation is the maximal viewing distance in which stereo viewing is still possible for a specific setup of a display and caustic surface(s). In order to experience stereoscopic vision, each eye should ideally get a different image (of the world or a displayed 3D image).

Using the techniques described herein or an extension thereof, one may illuminate the caustic surface with two light sources separated from each other by the distance between human eyes (e.g., about 6.5 centimeters). For standard lenticular lenses, the relative position of the two light sources reflected by the caustic surface on the back surface will get closer to each other when the light is further apart from the display. The point spread function (psf) may be observed of the two color light sources on the back of the display (or the system's optics or optical assembly), and, once they are unseparated, the distance may be identified as the maximal stereo distance limit of the display system.

Figure 4:
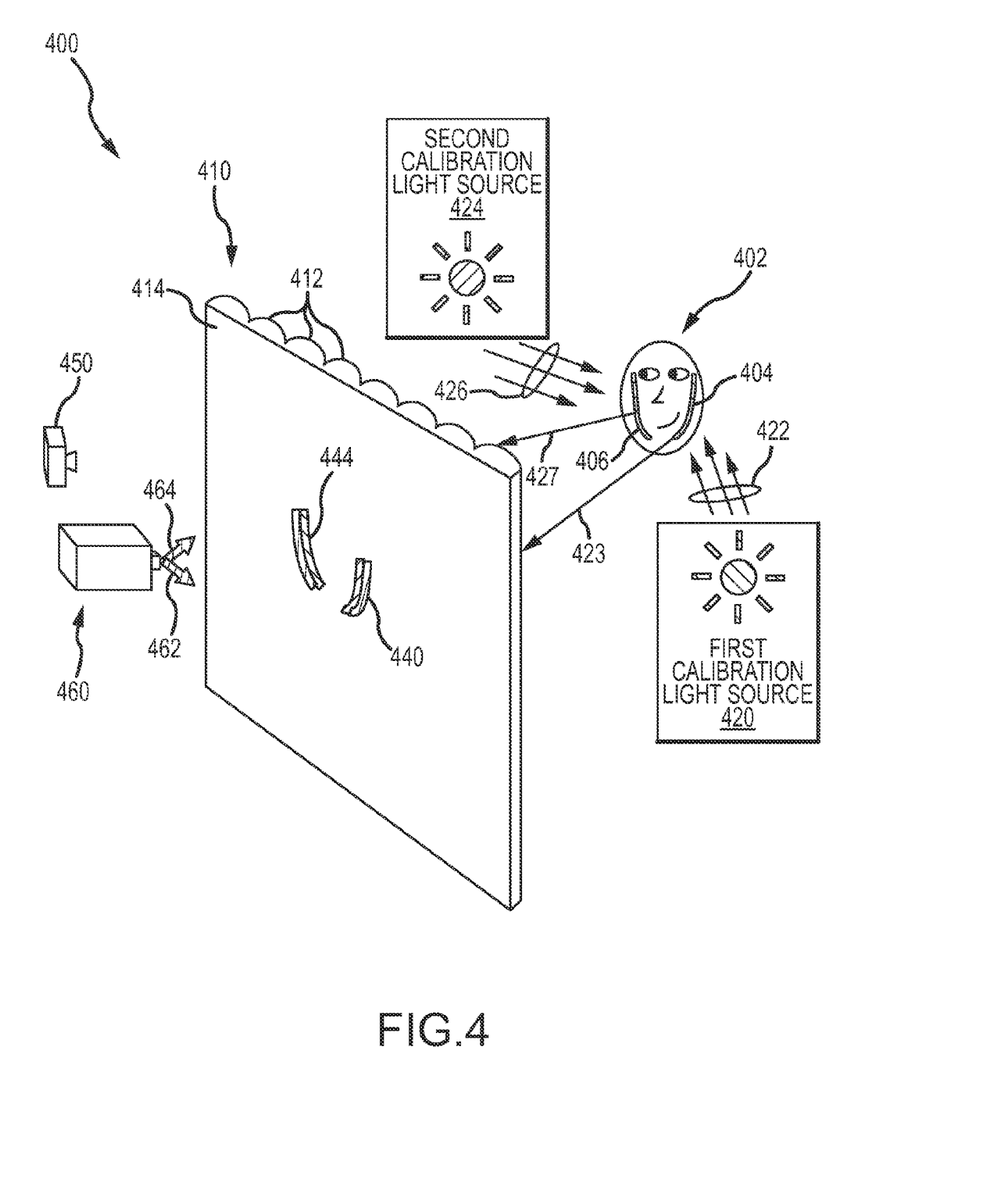
FIG. 4 is a functional block or schematic diagram of another 3D display system configured for selectively projecting light onto two sides of a viewer's face in a calibrated manner.

FIG. 4 illustrates another embodiment of a 3D display system 400 in which the optics 410 are shown to be made up of a sheet or pane of lenticular material, which has lenticules 412 on a side that faces outward into a display space where one or more viewers 402 are located. A planar back side 414 of the optics 410 provides a projection surface for a projector 460. A first calibration light source 420 directs light 422 onto a first side 404 of the viewer's face, and the reflected light 423 strikes the lenticules 412. This causes the projection surface or back side 414 to be illuminated as shown at 440.

Similarly, a second calibration light source 424 directs light 426 onto a second side 406 of the viewer's face, and the reflected light 427 strikes the lenticules 412 on the first or exposed side of the optics 410. This causes the projection surface or back side 414 to be illuminated differently than the light 423 as shown at 444. A camera or other light sensing device 450 captures/records this illumination of the projection surface 414. As discussed above, the pixels of the camera 450 are mapped to the pixels of the projector 460. The captured image is used to generate a calibration map for the optics 410 based on the position of the viewer 402 and illumination of the sides 404, 406 of the viewer's face. Then, the calibration map may later (or nearly concurrently) be used to operate the projector to first project light 462 to send light/images through the optics 410 including lenticules (caustic surfaces) 412 to the first side 404 of the viewer's face and to second (typically concurrently) project light 464 through the optics 410 to send light/images through the optics 410 and lenticules 412 to the second side 406 of the viewer's face.

In the display system 400 of FIG. 4, the system is similar to that shown in FIG. 2 with a projector, a back-projection foil/surface, and a lenslet array being used. In contrast to the system of FIG. 2, the camera observing the projection surface is mounted in a fixed location and no position or head tracking is used. In the system 400, the viewing or display area is illuminated from the left and right sides with two light sources, which may be selected to have distinct wavelengths in the visible range or, often more preferably, in the infrared or invisible light range. The wavelengths can be either monochromatic or narrow band, but it can also be provided using multi-wavelength band pass filters or the like, with one preference being that a strict separation is provided for the two sets of the wavelengths chosen to illuminate the two sides of the viewer's face. Again, the mapping between the camera and the projector pixels may be computed beforehand (e.g., using standard projector-to-camera mapping routines or techniques).

During calibration, a viewer's left and right halves of their face are illuminated by light with this light from distinct sets of wavelengths. The light is refracted by the caustic surface and casts two illumination patterns on the projection screen. The camera (or two cameras may be used with one being used for each set of wavelengths) maps these illuminated regions to projector pixels, which are then configured to project the corresponding left images for left eyes and right images for right eyes of viewers. Instead of having a wavelength separation of the two required lighting conditions, another solution may involve applying a high speed temporal solution that is synchronized with the one or more recording cameras.

As will be understood, the viewers' faces themselves act to provide calibration light while the viewers are facing the screen (optics). No pre-calibration is required in this display system as the calibration mapping is real time during display operations (or immediately preceding a display of left and right images to left and right sides of a viewer's face). Conflicts between left and right eyes can be handled by discarding problematic pixels or by applying some advanced blending methods. Note, the approach shown in FIG. 4 is particularly useful for autostereoscopic display systems.

Figure 5:
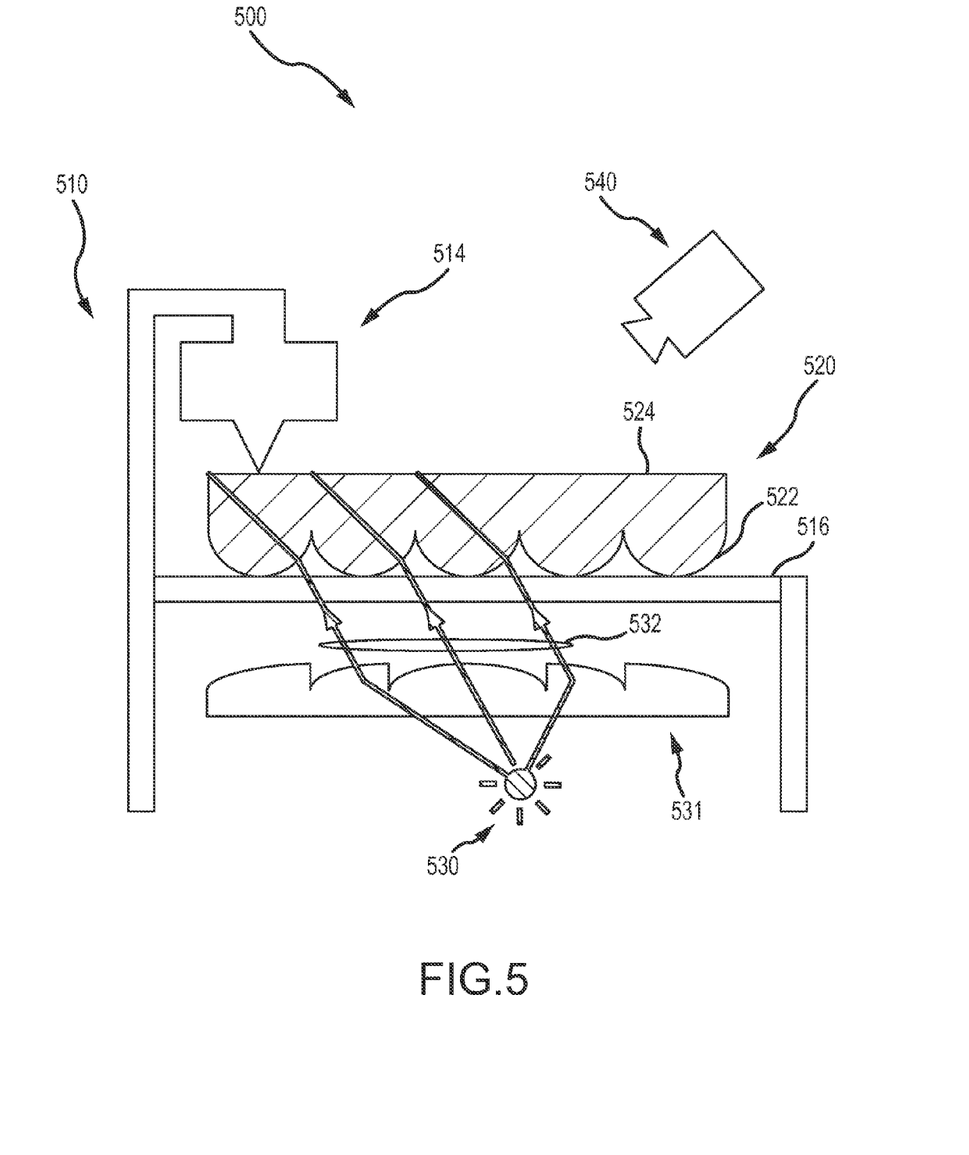
FIG. 5 illustrates schematically a printer system configured for light-based calibration of caustic surfaces.

FIG. 5 illustrates a calibration-enabled printer system 500 with a printer 510 including a printer head 514 and a transparent bottom/support pane 516. A sheet of lenticular material 520 is placed on the transparent bottom 516 for printing of an interlaced image with printer head 514. The lenticules or caustic surfaces 522 are facing the bottom/support pane 516 while a planar back side or surface 524 faces the printer head 514. The system 500 further includes a calibration light 530 and a Fresnel or other lens 531 for conditioning the light from the source 530 as shown at 532 to be parallel as it passes through the support pane 516 and strikes the caustic surfaces/lenticules 522 prior to illuminating the back side/planar surface 524 of the sheet 520. A camera or other light sensing device 540 is provided to record this illumination of the surface 524 by calibration light source 530. The camera 540 also generates a calibration map, which can be used to operate the printer 510 to use printer head 514 to print a calibrated, scrambled image for 3D or flip images visible through the lenticules or caustic surfaces 522.

In the embodiment shown in FIG. 5, the system 500 is adapted to improve the quality of existing state-of-the-art 3D and flip images. These devices typically are made up of a lenslet array and a printed image coinciding with the focal plane of the lenslet array. Multiple views are interleaved and printed below each lens or lenticule. Slight changes in the lens pitch, which are common due to manufacturing tolerances/precision, without adapting the printed pixel pattern below the lenslet array results in visible artifacts (e.g., the desired or correct flipping region often is not achieved in prior lenticular or similar display devices).

The light-based calibration techniques taught herein and as may be implemented as shown in the system 500 of FIG. 5 effectively improve quality of lenticular/lenslet array printed products or devices by determining the correct printing pattern for certain viewing positions for each optical assembly or lens sheet (or lenslet array). The light source in FIG. 5 may be configured to be able to change the direction of the parallel beams, and this special calibration light can be achieved using a collimator lens (such as a Fresnel lens) with a point light source, which is positioned and moves on the focal plane of the lens, e.g., where a viewer optimally would observe the 3D imagery created with an interleaved image printed on the back of the lens sheet/lenslet array.

As in other embodiments described herein, the camera may be calibrated towards the image generating device, e.g., a printer or, more accurately, a back surface of a lens sheet where a printed pattern will be printed/provided. This may be achieved using existing calibration procedures as finding point correspondences, e.g., using detected corners in printed checkerboards. The light source is configured for a specific angle, and the camera relates illuminated regions to printer pixel coordinates. The printer then is operated/controlled, based on the calibration map from the camera, to print a corresponding image for this specific viewing angle. The calibration procedure ignores the theoretical model of the lenses but takes imperfections like lens pitch shift into account. Using calibration light sources of different wavelengths, preferably the same as the color bases of the printer, e.g., cyan, yellow, and magenta, the setup can even account for color aberrations typical to all lens systems.

Figure 6:
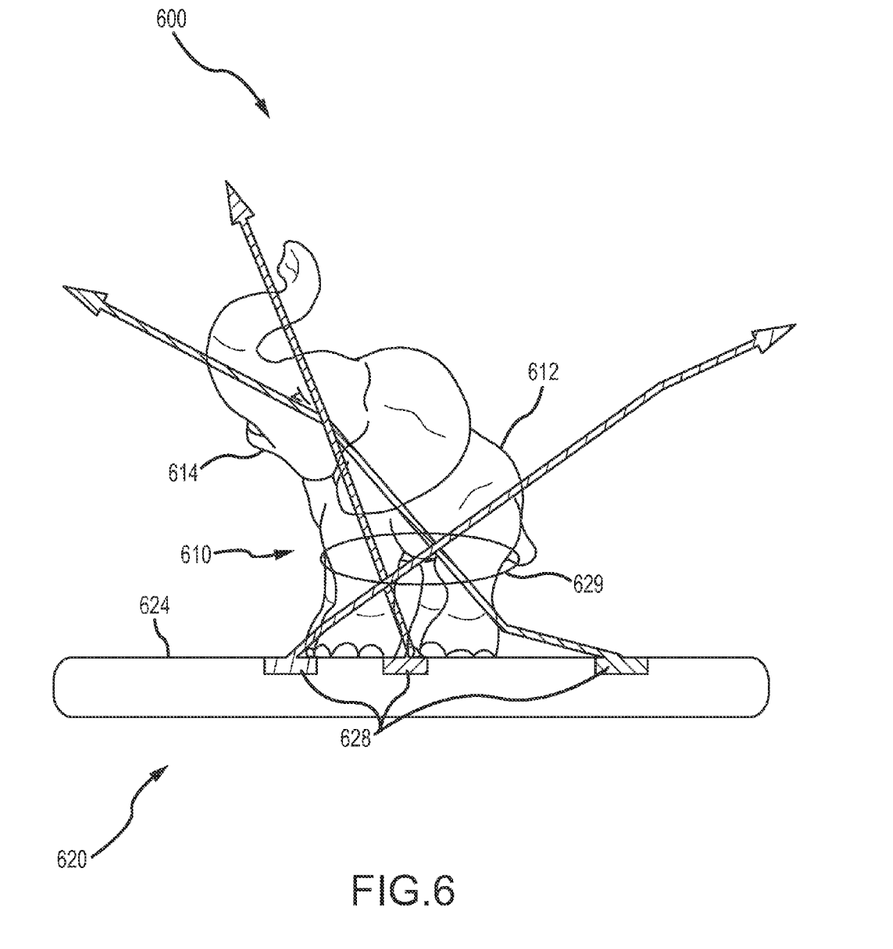
FIG. 6 illustrates a display system that emits light through a transparent object or figurine, which can be calibrated according to the techniques described herein.

FIG. 6 illustrates another display system 600 for which the calibration techniques may be used to improve display quality. As shown, a transparent/translucent figurine 610 that has a number of caustic surfaces (e.g., facets, curved surfaces, and so on) 612, 614 may be placed on a programmable light emitting device 620. For example, the light emitting device 620 may take the form of a digital tablet or the like and the figurine 610 may be placed on its output or display screen 624. Then, pixels 628 may be selectively (e.g., based on a calibration map) operated to illuminate the figurine 610 with calibrated light 629, which can be observed in a display or viewing space opposite the tablet 620. The figurine 610 may first undergo light-based calibration by positioning a calibration light source in the viewing/display space and replacing the tablet 620 with a camera (or using the screen/surface 624 to record/capture the illumination in some cases).

With regard to the display system 600 of FIG. 6, the calibration techniques may be used to improve visual appeal of displays involving transparent figurines such as crystal figurines or objects. Such transparent figurines/objects have many planar facets each providing a caustic surface patch such that the figurines have many caustic surfaces. The setup of this embodiment may include a tablet or similar display device and a figurine placed on the tablet upon a spot with a particular orientation (the spot and orientation can be marked on the tablet surface using software to display marks and outlines of the base of the figurine for example).

For calibration in some cases, a camera may be placed facing the tablet and calibrated to map camera pixels to tablet pixels. Additionally, a point light source is placed and moved to different positions indicating or associated with future, planned viewing positions in the display space. As in other embodiments, the camera can generate a calibration map that may then be used to create a per facet (per caustic surface patch) lookup table, which maps tablet pixels to viewing angles. The mapping is typically independent of color, with the software running on the tablet in some cases offering functionality to choose different colors for different caustic patches/surfaces and/or viewing angles.

A software application also may be provided, once the figurine is calibrated, that a user in possession of the figurine, a tablet, and the software application can use to place the figurine as indicated by the software application on the tablet. The user may then interact with a GUI or other input to the software application to color the figurine's surfaces (e.g., their clothes, their face, their hair, and other parts associated with different facets/caustic surfaces) in user-selected colors. Another use may be to increase attractiveness of such figurines in stores and other displays by placing them on tablets or other programmable light sources in windows or on shelves and changing the colors being emitted from different facets/caustic surfaces over time.

In other systems, a caustic mirror can be located in a specific location that is used with a programmable light source to reveal hidden messages. These messages may be projected with the light source through the caustic mirror to the environment or display space without a need to know the character of the caustic surface(s) of the mirror. Instead, the message is recorded and projected back so the hidden message can be revealed if observed using the same mirror.

In this embodiment, a desired message or picture is refracted and/or reflected through the caustic surface into the environment. A record optical sensor is used to capture the new projected content on top of an already existing picture. A projector that is pre-calibrated to the optical sensor (as discussed herein) is used to reproduce the displayed content on the environment. Positioning the magic surface (caustic mirror) in its original location and viewing it from the location where the hidden message was previously displayed will reveal the secret message though it was scrambled.

Although embodiments of the invention have been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As can be seen from the prior discussion, each embodiment of a calibration assembly may be thought of as including an arbitrarily shaped image generating device, at least one caustic surface patch, an observer, and at least one light source (e.g., a point light source emitting light uniformly into all directions or emitting collimated, parallel light beams). Both the point light source and the parallel beams were described by their incident angle, namely the angle between the normal in the surface patch center and the vector pointing from the surface center to the light source. In some embodiments, the observer or light sensing device and the calibration light source may be removed after calibration to provide a calibrated display system (e.g., a 3D display system).

Each caustic surface patch can be seen as an optical mapping from an incident angle to a certain region on the image generating device. Different angles map to different regions. Illuminating, for example, the regions in a specific color and/or wavelength illuminates the surface patch when viewed from the corresponding incident angle. This takes into account that different wavelengths experience different index of refraction within the same material. If this is not considered, chromatic aberration can occur. Due to the invertible nature of light, using the same wavelength as the one the display later emits, this will naturally account for such effects.

As regions for different incident angles and even different surface patches may overlap, emitted colors and/or wavelengths can mix together and, hence, the image of the image generating device preferably can be computed carefully to achieve the desired effects. Some embodiments calibrate an arrangement of an image generating device and caustic surface patches of an optical assembly using one or more light sources. Through calibration, the mapping function is revealed (and defined in a calibration map), which is then used to reconstruct desired color patterns (or light/images) on each caustic surface patch for different viewing positions.

The caustic surface calibration techniques described herein may be applied to a large variety of different applications, which may be based on optics with lenticular lenses and other caustic surfaces. For example, light-based calibration may be used to support glasses-free 3D cinema or display systems. One big obstacle for glasses-free 3D cinema is the lack of a proper calibration technique. This can result in an unsatisfying viewer experience due to the presence of artifacts such as ghosting of different viewpoints. The light-based calibration described herein is ideally suited for use in calibrating glasses-free 3D display systems and will enable more advances in 3D cinema research.

The calibration methods may also be used to improve advertisements based on lenticular technology. Lenticular technology can be applied to advertisements such as posters, light boxes, and so on that show different images when being viewed at different heights or from different angles. Such advertisements or marketing display systems may be used for example to show a different advertisement content to a child at a first lower height than to a parent at a second higher height, and the imagery can be displayed in a calibrated manner via the calibration mapping taught by the inventors.

The calibration method may be used to calibrate optics used in art installations such as those based on refractive screens. More specifically, another interesting application area for the calibration method is large art installations that are based on use of light sources and refractive screens, which may be calibrated according to the techniques described. For example, the calibration technology may be used to record the light transport of such art installations to easier and better design the overall experience.

The light-based caustic surface calibration may be used to calibrate lenticular home cinema and lenticular prints. The calibration can directly be applied to autostereoscopic home cinema and lenticular prints to improve the quality of the resulting 3D images by calibrating the images displayed or image source to the caustic surface(s) of the optics rather than using a non-calibrated light source or image with the lenticular array(s).

In other cases, the calibration method may be used to enhance glasses-free 3D content such as through adjustments for amusement park attractions. By using a feedback loop embodiment, for example, and based on invisible active illumination, multiple users/viewers may be provided personalized stereoscopic content optimized (via the calibration processes described herein) to their location, without relying on a head tracking vision system that may likely fail in many cases.

Another application area may be the usage of the calibration methods to hide signs or messages (e.g., provide camouflaged messages) in the displayed or projected scene lighting. The message/image may be revealed by placing refractive elements used to generate and pre-calibrate the scene lighting at specific locations that may be selected based on the light-based caustic surface calibration. Specifically, the required calibration mapping may be automatically generated using the calibration methods and systems taught herein.

We claim:

1. A light-based calibration method for calibrating caustic surfaces, comprising:
    mapping a light detecting device to a programmable light source;
    operating a calibration light source to direct light onto one or more caustic surfaces of an optical assembly;
    with the light detecting device, capturing an image of a projection surface of the optical assembly from the one or more caustic surfaces as the projection surface is illuminated by the light from the light source;
    processing the captured image along with the mapping of the light detecting device to the programmable light source to generate a calibration map of the optical assembly including the caustic surfaces;
    generating a lookup table from the calibration map; and
    operating the programmable light source to project light onto the projection surface using the lookup table to selectively illuminate sets of pixels.

2. The method of claim 1, wherein the light detecting device comprises a digital camera or other assembly of light sensing diodes and wherein the mapping of the light detecting device to the programmable light source comprises mapping pixels of the digital camera or other assembly of light sensing diodes to pixels of the programmable light source.

3. The method of claim 2, wherein the programmable light source comprises a digital projector, a liquid crystal display, or an organic light emitting diode display.

4. The method of claim 2, wherein the calibration map comprises a mapping of illuminated ones of the pixels of the digital camera or other assembly of light sensing diodes to a set of the pixels of the programmable light source.

5. The method of claim 1, further comprising determining a position of the calibration light source during operating of the calibration light source step, wherein the calibration map of the optical assembly is linked to the position of the calibration light source to define operations of the programmable light source to illuminate the projection surface to direct light toward the position of the calibration light source.

6. The method of claim 5, further comprising moving the calibration light source to a different position and repeating the operating, the capturing, the processing, and the determining steps to create a different calibration map associated with the different position of the calibration light source.

7. The method of claim 1, wherein the caustic surfaces of the optical assembly are at least one of lenticules in a sheet of lenticular material, lenses of a lenslet array, facets of a transparent element, and curved surfaces of an optical element.

8. A method of calibrating optical elements, comprising:
    positioning an optical element with a first side having a caustic surface between a digital camera and a light source;
    with the light source, illuminating the first side of the optical element with light;
    recording an image of a second side of the optical element during the illuminating of the first side of the optical element;
    creating a calibration map based on the recorded image of the second side of the optical element; and
    mapping pixels of a digital camera to pixels of a programmable light source with the digital camera positioned to focus upon the second side of the optical element and the programmable light source positioned to project light onto the second side of the optical element.

9. The method of claim 8, wherein the recorded image comprises one or more illuminated regions and the calibration map defines sets of the pixels of the programmable light source to be used to project light onto the second side at locations associated with the one or more illuminated regions.

10. The method of claim 8, further comprising repositioning the light source and repeating the illuminating, the recording, and the creating steps to generate a second calibration map associated with a second position of the light source relative to the first side of the optical element.

11. The method of claim 8, wherein the illuminating of the first side comprises operating a point light source to provide the light.

12. The method of claim 8, wherein the light source is configured such that the light is collimated light.

13. A display system adapted for light-based calibration, comprising:
   an optical element with one or more caustic surfaces;
   a programmable light source positioned to selectively direct light onto a projection surface of the optical element that is opposite the one or more caustic surfaces;
   a calibration light source, positioned in a viewing space, directing light onto the one or more caustic surfaces, whereby regions of the projection surface are illuminated by the light after passing through the one or more caustic surfaces; and
   a light sensing device, mapped to the programmable light source, capturing an image of the illuminated regions of the projection surface and generating a calibration map mapping the illuminated regions to output devices of the programmable light source.

14. The system of claim 13, wherein the calibration map maps pixels of the programmable light source to the illuminated regions of the projection surface.

15. The system of claim 14, wherein the light sensing device is operated based on the calibration map to selectively light the mapped pixels to direct light onto the projection surface, whereby the light from the programmable light source travels through the caustic surfaces toward the position of the calibration light source in the viewing space.

16. The system of claim 13, further comprising a position tracking device determining a position of the calibration light source in the viewing space and wherein the calibration map is linked to the determined position.

17. The system of claim 13, wherein a viewer is located in the viewing space, wherein the calibration light source comprises a first light source directing light onto a first side of a face of the viewer and a second light source directing light onto a second side of the face of the viewer, and wherein the illuminated regions of the projection surface in the captured image are associated with light reflected from the first and second sides of the face onto the one or more caustic surfaces in the calibration map.

18. The system of claim 13, wherein the programmable light source comprises a digital projector, a liquid crystal display, or an organic light emitting diode display and wherein the optical element comprises at least one of: a lens, a sheet of lenticular material, a fly's eye lenslet array, a transparent object with a plurality of planar or curved facets.

* * * * *